United States Patent [19]

Schnorr et al.

[11] Patent Number: 5,961,829
[45] Date of Patent: *Oct. 5, 1999

[54] METHOD AND AN APPARATUS FOR THE PURIFICATION OF WATER, MORE PARTICULARLY FROM A COMPOSTING PROCESS

[75] Inventors: Karl-Ernst Schnorr, Lahnau; Markus Claudy, Solms, both of Germany

[73] Assignee: Herhof Umwelttechnik GmbH, Solms-Niederbiel, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/557,177

[22] PCT Filed: Apr. 13, 1995

[86] PCT No.: PCT/EP95/01392

§ 371 Date: Aug. 21, 1996

§ 102(e) Date: Aug. 21, 1996

[87] PCT Pub. No.: WO95/28359

PCT Pub. Date: Oct. 26, 1995

[30] Foreign Application Priority Data

Apr. 14, 1994 [DE] Germany ............................ 44 12 890

[51] Int. Cl.⁶ .................................. C02F 3/00; C02F 3/02
[52] U.S. Cl. ...................... 210/603; 210/620; 210/622; 210/623; 210/624; 210/626; 210/650
[58] Field of Search .................................. 210/603, 605, 210/612, 613, 614, 620, 622, 623, 624, 626, 630, 650, 96.1, 150, 151, 202, 205; 71/9, 13

[56] References Cited

U.S. PATENT DOCUMENTS

| | | | |
|---|---|---|---|
| 3,788,474 | 1/1974 | Granger et al. | 210/137 |
| 3,950,249 | 4/1976 | Eger et al. | 210/195.3 |
| 4,369,194 | 1/1983 | Arsovic | 210/603 |
| 4,468,463 | 8/1984 | Arsovic | 210/903 |
| 4,481,112 | 11/1984 | Hitzel | 210/620 |
| 4,749,494 | 6/1988 | Tomoyasu et al. | 210/626 |
| 4,793,930 | 12/1988 | Soeder et al. | 210/614 |
| 4,882,058 | 11/1989 | Burton | 210/622 |
| 5,053,581 | 10/1991 | Hildinger et al. | 585/638 |
| 5,071,559 | 12/1991 | Bleeker | 210/605 |
| 5,120,448 | 6/1992 | Dorica et al. | 210/724 |
| 5,132,015 | 7/1992 | Down | 210/321.65 |
| 5,185,079 | 2/1993 | Dague | 210/603 |
| 5,232,596 | 8/1993 | Castaldi | 210/603 |
| 5,240,611 | 8/1993 | Burton | 210/603 |
| 5,395,514 | 3/1995 | Siegler | 210/321.66 |
| 5,490,933 | 2/1996 | LaPack et al. | 210/603 |

FOREIGN PATENT DOCUMENTS

| | | |
|---|---|---|
| 25 41 070 | 3/1977 | Germany . |
| 3811399A1 | 10/1988 | Germany . |
| 3637393C2 | 6/1989 | Germany . |

*Primary Examiner*—Jay H. Woo
*Assistant Examiner*—Betsey J. Morrison
*Attorney, Agent, or Firm*—Evenson, McKeown, Edwards & Lenahan P.L.L.C.

[57] ABSTRACT

In a sealed container, organic material, more especially biowaste is composted. The exhaust air from the sealed container is purified in an exhaust air cleaning unit. In order to improve the cleaning effect, the condensate water from the exhaust air cleaning unit is supplied to a high performance bioreactor, in which it is brought into contact with atmospheric oxygen and is agitated. The suspension leaving from the bioreactor is caused to flow in a circuit through an ultra-filtration module for purifying the water.

8 Claims, 3 Drawing Sheets

METHOD AND AN APPARATUS FOR THE PURIFICATION OF WATER, MORE PARTICULARLY FROM A COMPOSTING PROCESS

FIELD OF THE INVENTION

The invention relates to a method for the purification of water, more especially condensate originating from a composting process and to the use of a bioreactor for performing such a method. The invention furthermore relates to a method for the composting of organic materials and to an apparatus for the performance of this method.

BACKGROUND OF THE INVENTION

The German patent publication 3,637,393 C, the German patent publication 3,811,399 A and the German patent publication 2,541,070 A disclose composting methods, in which organic materials, more particularly those containing waste materials (or "biowaste"), are composted. More particularly the said German patent publication 3,637,393 C, describes a method and an apparatus, in which organic materials are composted in a sealed container using forced ventilation.

In the prior art composting methods exhaust air purification takes place, with the production of water, since on falling below the dew point on cooler surfaces water vapor entrained in the air and originating from the biological reaction or, respectively, conversion is condensed out.

The composting of kitchen and garden waste, which has been separately handled in the garbage collection service, leads to the release of substantial quantities of water. When the hot exhaust air has cooled down so far that no odors escape into the atmosphere, condensate is produced. So far exhaust air from biological processes, more particularly from composting processes, has been passed through biological filters for reducing the odor fraction, the humidity water being substantially caused to precipitate, this meaning that the filters became clogged on the inlet side. The liquid then produced, which is hard to dispose (also named "percolating water") is heavily contaminated owing to the contact with the biomass and accordingly possessed a very high oxygen requirement (a CSB of approximately 40,000 to 80,000 mg $O_2/l$). As a consequence of technical developments filters were provided with upstream cooling traps or scrubbers so that the liquid no longer came into contact with the biomass, in order to reduce the CSB (chemical oxygen requirement) value and the BSB (biochemical oxygen requirement) value of the condensate. The CSB values then resulting amounted approximately to 5,000 mg $O_2/l$. This value as well is however still in need of improvement.

SUMMARY OF THE INVENTION

One object of the invention is to provide a method for the purification of water, more particularly condensate resulting from a composting process, with which such purification action may be improved upon.

In accordance with the invention this aim is to be achieved by cleaning the water in a bioreactor, more particularly a high performance bioreactor.

Preferably the water is brought into contact with oxygen, preferably atmospheric oxygen, in the bioreactor and/or agitated.

The water is preferably filtered. It is an advantage if the water is ultra-filtered, for example in an ultra-filtration module.

The composition of the water to be purified is preferably so altered that a biological clarification process is possible.

Preferably the active substances, which determine the oxygen requirement, in the water to be purified are measured. In accordance with a further advantageous development the active substances to be removed from the water are set. This is preferably by measurement of the active substances, on which the oxygen requirement depends, in the water to be purified. A further advantageous development of the invention is characterized in that by inoculating the water to be purified the course of the metabolic functions of the microorganisms, which are introduced, is set. After this the individual substrate parameters (as for example oxygen, carbon, nitrogen, phosphorus, pH value and/or temperature) and the changes resulting therefrom in the metabolic functions may be ascertained. Preferably, the water borne active substances set are filtered from the water. A further advantageous development is characterized in that control of the metabolic functions in the bioreactor is performed by the introduction of oxygen, more particularly atmospheric oxygen and/or the introduction of nutrients and/or by control of the pH value and/or by control of temperature.

Preferably the control of the filtering action, more especially the diaphragm filter action, is by pressure control and/or control of the overflow rate.

The invention furthermore contemplates the use of a bioreactor, more especially a high performance bioreactor, for the performance of the novel method for the purification of water.

The invention furthermore contemplates a method for composting organic materials, more particularly for composting waste, which contains organic materials (or biowaste). Such composting is preferably performed in a sealed container with the use of forced ventilation.

The above mentioned aim is achieved in accordance with the invention in the case of such a method because the organic materials are composted and because the water then produced, more especially in the form of condensate, is purified using the method of the invention for the purification of water.

Preferably the exhaust air from the bioreactor is returned to the said composting ventilation circuit. The exhaust air from the bioreactor is produced more particularly owing to the mixing of the content of the bioreactor with oxygen or respectively atmospheric oxygen.

In accordance with a further advantageous further development the overflow mud, which collects, more particularly in the bioreactor, is composted. Preferably such overflow mud is composted together with the materials to be composted.

The invention furthermore contemplates an apparatus for the performance of the method in accordance with the invention for composting organic materials. In order to attain the above mentioned aim such an apparatus is characterized in accordance with the invention by a container, more particularly a sealed container, provided with forced ventilation means, for composting organic materials and by a bioreactor, more especially a high performance bioreactor, for the purification of the water then produced.

An advantageous further development of such an apparatus is characterized by a filter, more particularly an ultrafiltration module.

BRIEF DESCRIPTION OF THE DRAWINGS

One working embodiment of the invention will now be described in the following with reference to the accompanying drawings.

DETAILED DESCRIPTION OF THE INVENTION

In the container (aerobic fermenter) 1 organic waste or, respectively, waste which contains organic components, is composted. It is a question of a sealed container with forced ventilation means. The exhaust air is supplied to an exhaust air cleaning plant 2, in which the exhaust air is cooled down so that the water contained in the exhaust air condenses out. The condensate 3 is supplied to high performance bioreactor 4 in which the active substances contained in the water or, respectively, in the condensate are biologically degraded. The water or, respectively, the condensate is therefore purified in the bioreactor 4.

Figure 2:
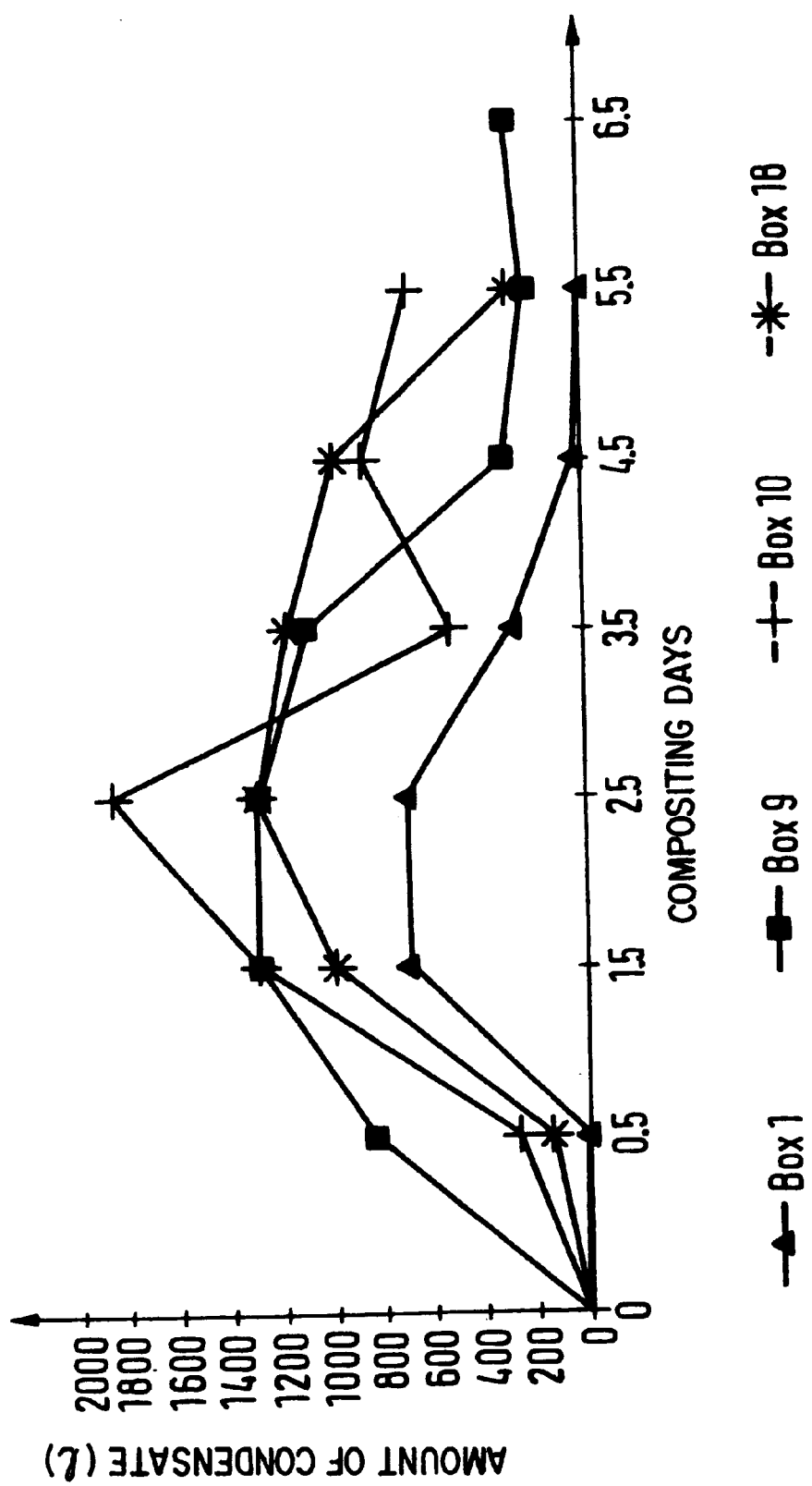
FIG. 2 shows changes in the amount of water condensate as function of time.

The quantities of water flowing into the bioreactor are dependent on the intensity of metabolism of the rotting mixture present in the container 1. These quantities of water may be seen by way of example in FIG. 2. In FIG. 2 the quantities of water condensate, i. e. the quantities of condensed water, which collects in the air purification unit and is supplied to the bioreactor, are plotted as a function of time. As shown in FIG. 2, the quantity of condensate water changes in the course of the rotting down process. Initially it increases until after about 1.5 to 2.5 days of rotting it reaches its maximum and then goes down again, a renewed increase being possible in some cases. After approximately 6.5 days of rotting the rotting process is terminated. As shown in FIG. 2, the maximum quantity of condensed water in the selected example is in a range of 800 to 1,800 liters. In FIG. 2 four curves are represented, each curve respectively representing changes in a particular rotting container.

Figure 3:
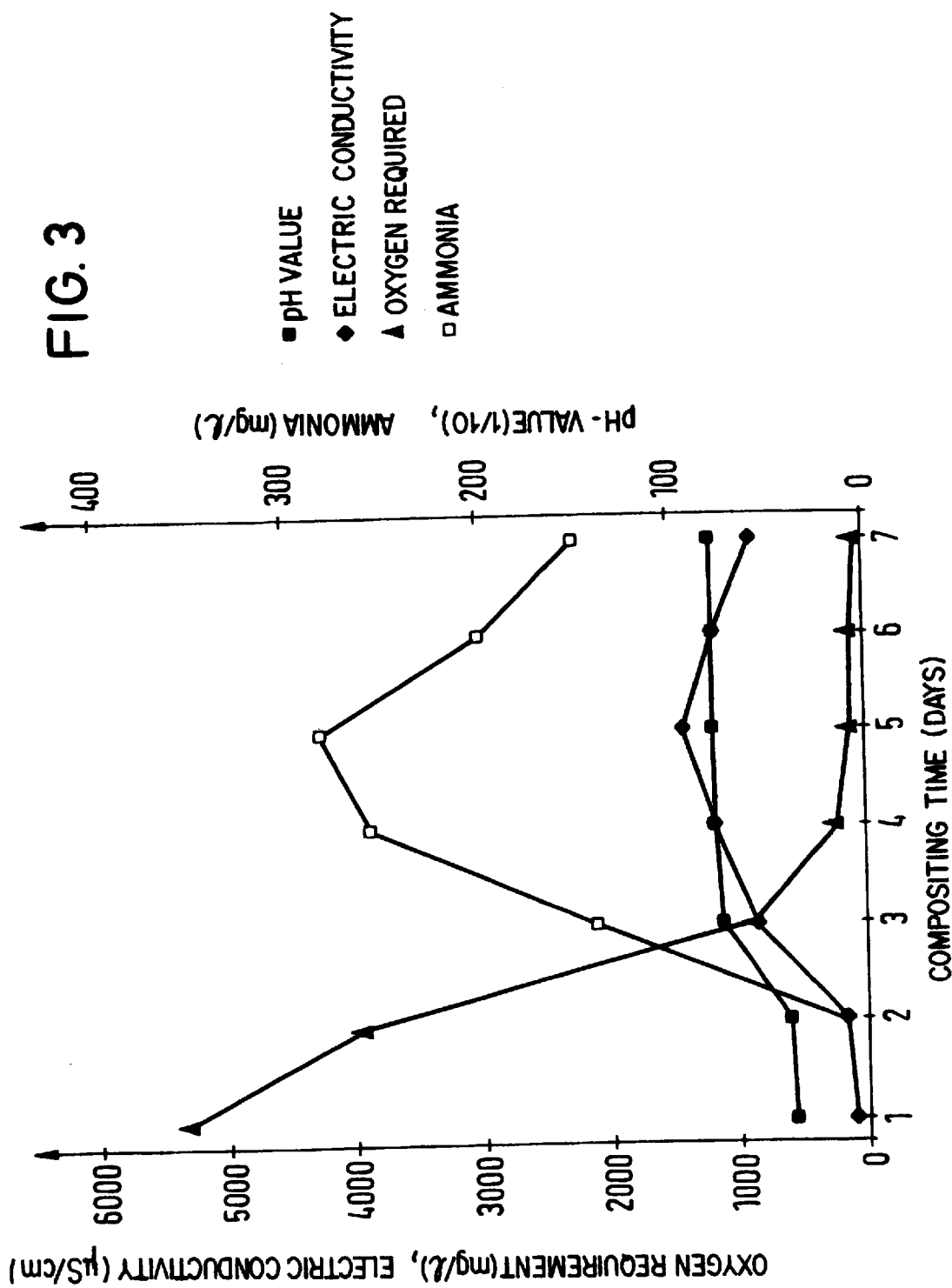
FIG. 3 shows changes in the composition of the condensate as a function of rotting down time.

The water borne active substances present in the condensate are represented in FIG. 3 as a function of time. The values for CSB in mg/l, electrical conductivity in $\mu$S/cm, pH and ammonium concentration in mg/l are plotted. The CSB value is represented by triangles, the electrical conductivity by the squares stood on their apices, the pH value by the filled (black) squares and the ammonium concentration by the unshaded (white) squares. The CSB value is at a maximum at the start of the composting process and then goes down. Electrical conductivity is initially low. After around five days of rotting it reaches a maximum and then drops again. The pH value increases during entire rot time at a slow rate. The ammonium concentration is initially low. It increases and after about four to five days of rotting reaches a maximum. After this it goes down again.

The liquid or, respectively, the water in the bioreactor 4 is mixed with oxygen, preferably atmospheric oxygen and agitated. Accordingly biological and mechanical purification takes place. The water is furthermore supplied by a pump 5 to an ultra-filtration module 6 where it is ultra-filtered. In the ultra-filtration module 6 a diaphragm filter is provided. The water purified by the diaphragm filter, i. e. the filtrate, is supplied to a collecting container (buffer container) 7, from which it may then be removed for use. The filter cake is returned via the line 8 to the bioreactor.

The control of the metabolic processes occurring in the high performance bioreactor 4 is by control of the oxygen input rate, and more particularly of the input rate of atmospheric oxygen, of the rate of input of nutrients, of the pH value and of temperature. The exhaust air resulting from the introduction of oxygen is returned via the line 9 to the ventilation air circuit of the composting system for further purification. The line 9 consequently runs to the container 1.

The control of the rate of operation of the diaphragm filter, that is to say the rate of operation of the ultra-filtration module 6 is by control of the pressure and of the overflow rate. The overflow mud collecting in the system is swilled off from time to time and supplied via the line 10 to the mixture undergoing rotting or composting. The line 10 consequently also leads to the container 1, this not being shown in FIG. 1.

Figure 1:
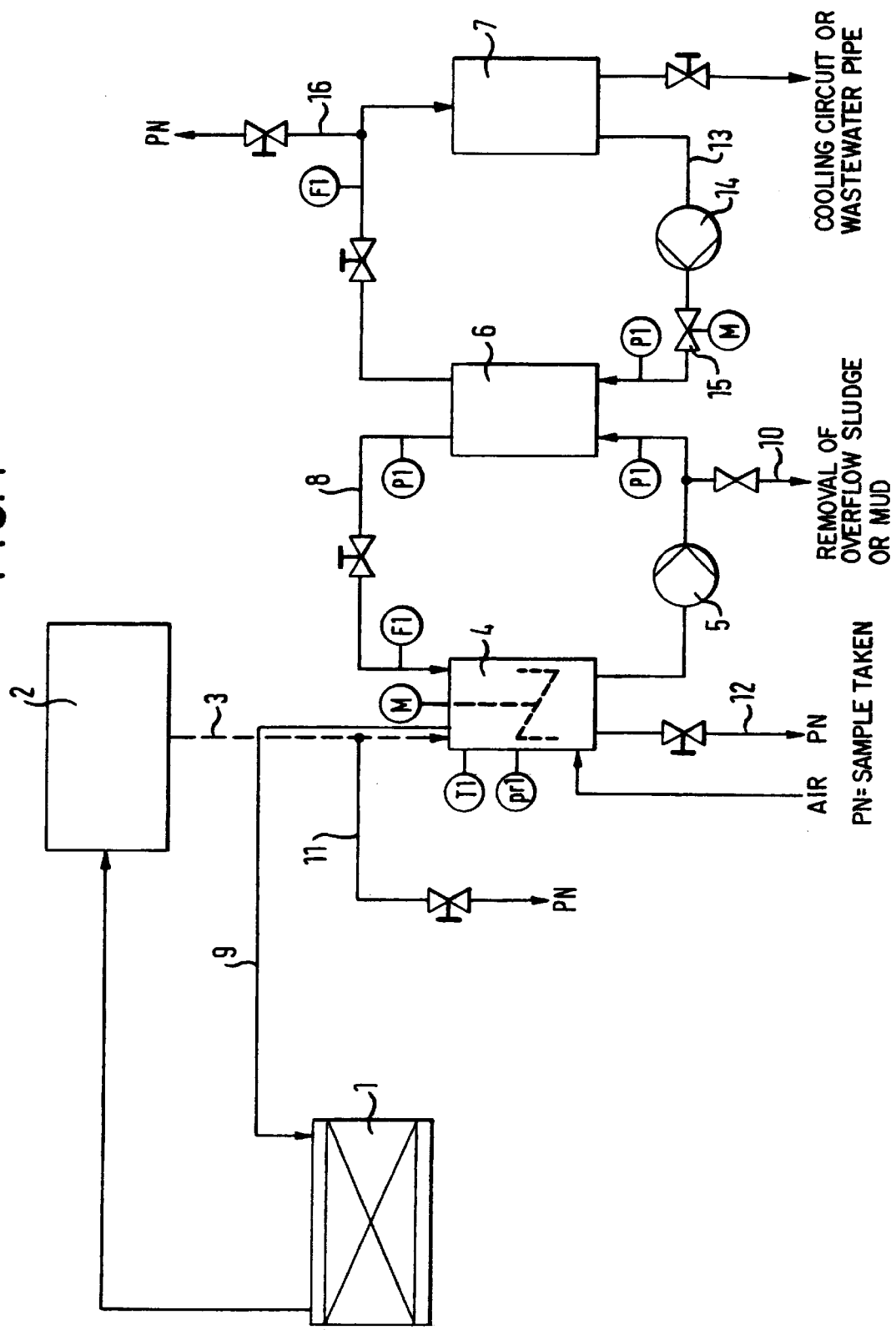
FIG. 1 shows a diagram of an apparatus for composting organic materials.

As shown in FIG. 1, a line 11 controlled by a valve is provided, which branches off from the condensate line 3 and from which a sample of condensate may be taken. Furthermore there is a line 12 with a control valve thereon, through which a water sample may be taken from the bioreactor 4. A further line 13 runs from the collecting container 7 back to the ultra-filtration module 6, on which there is a pump 14 and a shut off valve 15. The line 13 serves for reverse swilling of the ultra-filtration module.

From the line, which extends from the ultra-filtration module 6 to the collecting container 7, there branches a further line 16, which is controlled by a gate valve and through which a sample of the filtrate coming from the ultra-filtration module may be taken.

The water present in the collecting container 7 may be drawn off through a line, which is controlled by a gate valve. It may be introduced into a cooling circuit or a duct for dirty water.

The active substances significant for the oxygen requirement in the condensate 3 are able to be exactly measured. The invention is based on the discovery made by Justus von Liebig that "the minimum amount of nutrient determines yield". Related to the present invention this will mean that the composition of the condensate must be so altered that biological clarification is feasible, that is to say by control of the yield of bioreactor it is possible to set the active substances to be separated out. Such active substances are therefore initially set and then filtered out of the water. The setting of the water borne active substances on which the CSB value or, respectively, of the BSB value is dependent, in microorganisms is controlled by inoculation of the condensate to set the course of metabolic functions of the microorganisms introduced. After this the individual substrate parameters (as for example oxygen, carbon, nitrogen, phosphorus, the pH value and temperature) and the changes in metabolic functions resulting therefrom may be ascertained. Since the minimum nutrient factor present determines the yield, it is legitimate to assume that this notion may be extended to apply to the "growth factor" i. e. the "substrate parameter factor". Putting this into practice is by means of control technology. Since the supply of nutrients to a biozone also requires the swilling out of biomass in the course of formation, diaphragm filtration is employed to ensure that sufficient biomass is always retained as is necessary for maintaining optimum metabolic functions. This biomass is swilled back into the high perform biological system, i. e. into the high performance bioreactor.

The method of operation described in the present embodiment of the invention renders it possible to so improve the quality of the water that the condensate may be utilized as technical quality water for open evaporation circuits (for example for cooling exhaust air from biological processes).

We claim:

1. A method for the purification of condensate water having active substances from composting of waste containing organic materials in an aerobic sealed fermenter using forced ventilation, comprising the steps of:

a) measuring an amount of the active substances of the condensate water from the aerobic sealed fermenter to be supplied to a bioreactor;

b) determining an amount of oxygen to be added to the condensate water of step a) based on the measured amount of the active substances;

c) supplying the condensate water of step a) to the bioreactor;

d) adding the determined amount of oxygen to the condensate water in the bioreactor;

e) agitating the added oxygen and condensate water together in the bioreactor;

f) purifying the condensate water of step e) in the bioreactor;

g) supplying the purified water of step f) to an ultra-filtration module;

h) ultra-filtering the purified condensate water in the ultra-filtration module, thereby producing a filtrate and a filter cake;

i) supplying the filtrate to a collecting container;

j) depositing the filter cake in the bioreactor; and k) biologically treating the filter cake in the bioreactor.

2. The method of claim 1, further comprising the step of setting an amount of the active substances to be purified from the condensate water in the bioreactor.

3. The method of claim 1, further comprising the step of inoculating the condensate water with microorganisms for carrying out metabolic functions to purify the condensate water in the bioreactor.

4. The method of claim 3, further comprising the step of controlling the metabolic functions carried out by the inoculated microorganisms by at least one method selected from the group consisting of introduction of oxygen, introduction of nutrients, control of pH value and control of temperature.

5. The method of claim 1, further comprising the step of controlling a rate of the ultra-filtration of step g) by at least one of the methods selected from the group consisting of pressure control and overflow rate control.

6. A method for composting waste containing organic materials, comprising the steps of a) composting the waste; and b) purifying the water produced thereby by the method of claim 1.

7. The method of claim 6, further comprising the step of returning exhaust air from the bioreactor to a ventilation circuit of the composting step a).

8. The method of claim 6, further comprising the step of composting overflow mud with the waste to be composted.

* * * * *